(12) United States Patent
Walton et al.

(10) Patent No.: US 8,959,657 B2
(45) Date of Patent: Feb. 17, 2015

(54) SECURE DATA MANAGEMENT

(71) Applicant: AppSense Limited, Warrington (GB)

(72) Inventors: Travis Walton, Bolton (GB); Paul Delivett, Runcorn (GB); Richard James Somerfield, San Jose, CA (US)

(73) Assignee: AppSense Limited, Warrington (GB)

( * ) Notice: Subject to any disclaimer, the term of this patent is extended or adjusted under 35 U.S.C. 154(b) by 38 days.

(21) Appl. No.: 13/829,511

(22) Filed: Mar. 14, 2013

(65) Prior Publication Data

US 2014/0283107 A1 Sep. 18, 2014

(51) Int. Cl.
G06F 21/00 (2013.01)
G06F 21/62 (2013.01)

(52) U.S. Cl.
CPC ............... *G06F 21/62* (2013.01); *G06F 21/00* (2013.01)
USPC .......................................................... 726/27

(58) Field of Classification Search
CPC ...................................................... G06F 21/00
USPC .......................................................... 726/27
See application file for complete search history.

(56) References Cited

U.S. PATENT DOCUMENTS

| 4,962,533 | A | * | 10/1990 | Krueger et al. ............... 711/163 |
| 7,529,932 | B1 | | 5/2009 | Haustein et al. |
| 2010/0228937 | A1 | | 9/2010 | Bae et al. |

FOREIGN PATENT DOCUMENTS

| JP | 2004287789 A | 10/2004 |
| WO | WO-0214989 A2 | 2/2002 |
| WO | WO-2013055501 A1 | 4/2013 |

OTHER PUBLICATIONS

Encrypting File System, http://en.wikipedia.org/wiki/Encrypting_File_System, retrieved on Jul. 24, 2013, 8 pages.
iOS App Programming Guide, http://developer.apple.com/library/ios/#DOCUMENTATION/iPhone/Conceptual/iPhoneOsProgrammingGuide/AdvancedAppTricks/AdvancedAppTricks.html#//apple_ref/doc/uid/TP40007072-CH7-SW11, Apr. 23, 2013, 149 pages.
Fingerprint (computing), http://en.wikipedia.org/wiki/Fingerprint_%28computing%29, reteieved on Jul. 24, 2013, 4 pages.
Citrix ShareFile, http://www.sharefile.com/, printed on Jul. 24, 2013, 2 pages.
OpenText Managed File Transfer, http://connectivity.opentext.com/resourcecentre/evaluations/opentext-managed-file-transfer.aspx, 2011, 1 page.

(Continued)

*Primary Examiner* — Jacob Lipman
(74) *Attorney, Agent, or Firm* — Wilmer Cutler Pickering Hale and Dorr LLP

(57) ABSTRACT

The disclosed subject matter includes a method. The method includes identifying an attempt to access, by an application instance running in a user space of an operating system, a first security zone of a computer readable medium, where the first security zone is associated with a first security level. The method further includes determining whether a restriction level associated with the application instance is higher than the first security level, where the restriction level is a function of previous security zones that have been accessed by the application instance. When the restriction level associated with the application instance is higher than the first security level, the method would prevent the application instance from writing to the first security zone. When the restriction level associated with the application instance is not higher than the first security level, the method would authorize the application instance to access the first security zone.

20 Claims, 9 Drawing Sheets

(56) References Cited

OTHER PUBLICATIONS

New Media Security for PC FAQs, http://www.newmediasecurity.com/products/nms_for_pc_faqs.html, printed on Mar. 10, 2014, 4 pages.

United Kingdom Search Report issued by the Intellectual Property Office for the United Kingdom for Application No. GB1404501.7 mailed on Sep. 22, 2014 (3 pages).

United Kingdom Search Report issued by the Intellectual Property Office for the United Kingdom for Application No. GB1404513.2 mailed on Aug. 5, 2014 (3 pages).

* cited by examiner

Security Level Table

PID_A

| Security level | 1 | 2 | 3 | 4 | 5 | 6 | 7 | 8 | 9 |
|---|---|---|---|---|---|---|---|---|---|
| Count | 0 | 2 | 1 | 0 | 2 | 0 | 0 | 0 | 1 |

PID_B

| Security level | 1 | 2 | 3 | 4 | 5 | 6 | 7 | 8 | 9 |
|---|---|---|---|---|---|---|---|---|---|
| Count | 3 | 0 | 0 | 1 | 0 | 2 | 0 | 0 | 0 |

FIG. 8

SECURE DATA MANAGEMENT

CROSS-REFERENCE TO RELATED APPLICATION

This application is related to U.S. application Ser. No. 13/829,018, entitled "SECURE DATA MANAGEMENT," filed on the same date as the present application, which is incorporated by reference herein in its entirety.

BACKGROUND

Managing data security is an important task for computing systems. Oftentimes, a computer system maintains both public data and confidential data. While public data can be accessed by a general public, confidential data should only be accessed by selected individuals. Therefore, a computer system should control data access based on the authority granted to individuals.

A computer system can address this issue by associating a computer readable medium with a security level and by associating an application (or a user operating the application) with an authority level. For example, if an application has an authority level that is less than the security level associated with the computer readable medium, the computer system can prevent the application from accessing data in the computer readable medium.

Unfortunately, simply controlling data access is not sufficient to prevent data leakage, partially because a single application can access multiple data items simultaneously. For example, if an application with a high authority level retrieves a file from a computer readable medium with a high security level, and creates a new file, based on the "high security" file, at another computer readable medium with a lower security level, then another application with a lower authority level can access the new file and gain access to information that was protected at the high security level.

As another example, if an application with a high authority level retrieves a file from a computer readable medium with a high security level, and copies (i.e., cuts-and-pastes) information in the "high security" file to a "low security" file stored in a low-security computer readable medium, then another application with a lower authority level can access the "low security" file and gain access to information that was protected at the high security level.

Therefore, there is a need in the art to provide systems and methods for improving the data security management. Accordingly, it is desirable to provide methods and systems that overcome these and other deficiencies of the related art.

SUMMARY

In accordance with the disclosed subject matter, systems and methods are provided for providing secure data management.

The disclosed subject matter includes a method. The method can include identifying, by a module in a computer system, an attempt to access, by an application instance running in a user space of an operating system, a first security zone of a computer readable medium, where the first security zone is associated with a first security level. The method can further include determining, by the module, whether a restriction level associated with the application instance is higher than the first security level, where the restriction level is a function of previous security zones that have been accessed by the application instance. When the restriction level associated with the application instance is higher than the first security level, the method can include preventing the application instance from writing to the first security zone. When the restriction level associated with the application instance is not higher than the first security level, the method can include authorizing the application instance to access the first security zone.

The disclosed subject matter also includes an apparatus. The apparatus can include a non-transitory memory storing computer readable instructions, and a processor in communication with the memory and with a non-transitory computer readable medium having a first security zone. The computer readable instructions are configured to cause the processor to receive a request, from an application instance running in a user space of an operating system, to access the first security zone, where the first security zone is associated with a first security level, and determine whether a restriction level associated with the application instance is higher than the first security level, where the restriction level associated with the application instance is a function of previous security zones that have been accessed by the application instance. When the restriction level associated with the application instance is higher than the first security level, the computer readable instructions are configured to cause the processor to prevent the application instance from accessing the first security zone. When the restriction level associated with the application instance is not higher than the first security level, the computer readable instructions are configured to cause the processor to authorize the application instance to access the first security zone.

The disclosed subject matter further includes a non-transitory computer readable medium. The non-transitory computer readable medium can include executable instructions operable to cause an apparatus to identify an attempt, by an application instance running in a user space of an operating system, to access a first security zone of non-transitory memory, wherein the first security zone is associated with a first security level. The executable instructions are also be operable to cause an apparatus to determine whether a restriction level associated with the application instance is higher than the first security level, where the restriction level associated with the application instance is a function of previous security zones that have been accessed by the application instance. The executable instructions can also be operable to cause an apparatus to prevent the application instance from writing to the first security zone when the restriction level associated with the application instance is higher than the first security level. The executable instructions can also be operable to cause an apparatus to authorize the application instance to access the first security zone when the restriction level associated with the application instance is not higher than the first security level.

In one aspect, the method, the apparatus, or the non-transitory computer readable medium can include steps, modules, or executable instructions for determining whether the application instance is associated with any restriction level and for authorizing the application instance to access the first security zone when the application instance is not associated with any restriction level.

In one aspect, the method, the apparatus, or the non-transitory computer readable medium can include steps, modules, or executable instructions for receiving a request, from the application instance, to authorize a read operation to a second security zone of the computer readable medium, where the second security zone is associated with a second security level, for determining whether the restriction level associated with the application instance is higher than the second security level, and for modifying the restriction level of the application instance as the second security level when the restriction level associated with the application instance is higher than the second security level.

In one aspect, the method, the apparatus, or the non-transitory computer readable medium can include steps, modules, or executable instructions for determining whether the application instance is associated with any restriction level and for associating the application instance with a restriction level when the application instance is not associated with any restriction level, where the restriction level is set as the second security level.

In one aspect, the restriction level associated with the application instance is a highest security level of all previous security zones that have been accessed by the application instance.

In one aspect, wherein the steps, modules, or executable instructions of the method, the apparatus, or the non-transitory computer readable medium are executed in a kernel space of the operating system.

In one aspect, wherein the steps, modules, or executable instructions of the method, the apparatus, or the non-transitory computer readable medium are executed by a loadable kernel module in the kernel space of the operating system.

In one aspect, the association between the first security zone and the first security level is maintained in a configuration file stored in the non-transitory memory.

In one aspect, the request to access the first security zone includes a request to authorize a write operation to the first security zone.

It is to be understood that the disclosed subject matter is not limited to the specific configurations described herein. Other embodiments are possible. Also, the wording used herein is for the purpose of description and should not be regarded as limiting.

BRIEF DESCRIPTION OF THE FIGURES

Various objects, features, and advantages of the disclosed subject matter can be more fully appreciated with reference to the following detailed description of the disclosed subject matter when considered in connection with the following drawings, in which like reference numerals identify like elements.

FIG. 8 is an illustration of an exemplary security level table.

DETAILED DESCRIPTION

Embodiments of the disclosed computer system can provide secure data management. For example, a computer system can include a memory that is divided into one or more computer security zones. The computer system can include a module that coordinates secure data management by monitoring applications running on the computer system and detecting any attempts by the application to access a particular security zone of the memory. When the module detects such an attempt, the module can determine whether the application is authorized to do so. Based on the determination, the module can authorize and/or prevent the application from accessing the particular security zone.

To provide such a data management mechanism, the module can generally include at least three functionalities. First, for example, the module can determine a restriction level of an application. The restriction level can be indicative of the types of storage media or security zones to which the application can write/read a data item. Second, for example, the module can control write privileges of an application based on the security level of storage media and the restriction level of the application. For example, if the restriction level of the application is higher than the security level of a storage medium, the module can prevent the application from writing to the storage medium. Third, for example, the module can cooperate with a notification application to notify the restriction level of an application to a user. Other embodiments are within the scope of the disclosed subject matter.

The disclosed module can be useful in prohibiting insecure data transfers within an application instance. For example, if an application instance is accessing a high security file retrieved from a computer readable medium of a first security level, the module can update the restriction level of the application instance to the first security level so that the application instance cannot write to another storage medium having a lower security level than the high security level. This way, the module can prevent an application instance from copying information from a high security file and storing the copied information to a low security file. Furthermore, the module can prevent an application instance from saving a high security file as a low security file.

The disclosed module can also be useful in preventing insecure data transfers across application instances. For example, the module can keep track of restriction levels associated with application instances, and notify restriction levels of application instances to users. By notifying restriction levels, users can be prevented from inadvertently copying confidential information from a first application instance and storing it using a second application instance.

Figure 1:
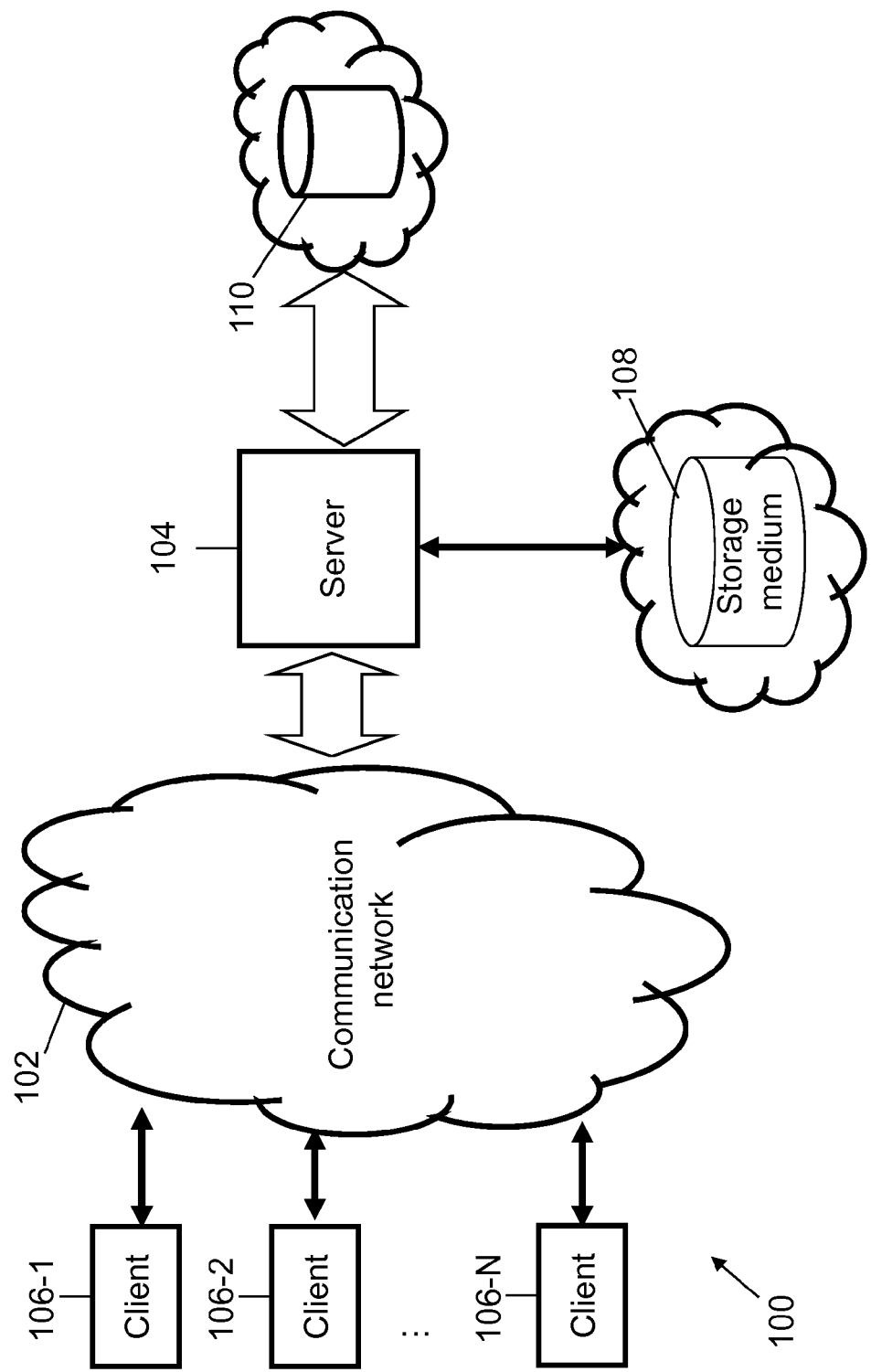
FIG. 1 is a diagram of an exemplary networked communication system.

FIG. 1 is a diagram of an exemplary networked communication system. The networked communication arrangement 100 can include a communication network 102, a server 104, and at least one client 106 (e.g., client 106-1, 106-2, . . . 106-N), a local network storage 108, a remote network storage 110, and a correspondence table 112.

Each client 106 can send data to, and receive data from, the server 104 over the communication network 102. Each client 106 can be directly coupled to the server 104; alternatively, each client 106 can be connected to server 104 via any other suitable device, communication network, or combination thereof. For example, each client 106 can be coupled to the server 104 via one or more routers, switches, access points, and/or communication networks (as described below in connection with communication network 102). A client 106 can include, for example, a desktop computer, a mobile computer, a tablet computer, a cellular device, or any computing system that is capable of performing computation. The client 106 can also include a computer readable medium for storing data. The server 104 can be a single server, or a network of servers, or a farm of servers in a data center. The server 104 can include a computer readable medium for storing data.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the network 102 as a single network; however, the network 102 can include multiple interconnected networks listed above.

The server 104 can be coupled to a network storage system. The network storage system can include two types of network storage devices: a local network storage 108 and a remote network storage 110. The local network storage 108 and the remote network storage 110 can each include at least one physical, non-transitory storage medium.

In some embodiments, the network storage system can be provided as an enterprise system in a corporate environment For example, the communication network 102 the proxy server 104, the clients 106, and the local network storage 108 can be located in a close proximity and can be a part of a single company. In contrast, the remote network storage 110 can be operated by a third party vendor that provides a remote network storage service to the clients 106. In some cases, the proxy server 104, the clients 106, and the local network storage 108 can be located in the same building and can be coupled to one another via a local communication network. The local communication network can include a local area network (LAN,) a corporate network, and a virtual private network (VPN) associated with the corporate network.

In some embodiments, the local network storage 108 can operate under different restrictions, security measures, authentication measures, and/or policies compared to the remote network storage 110. These restrictions, security measures, authentication measures, and/or policies can be set by a system administrator. In some cases, the local network storage 108 can only be accessed by certain clients, based on the location and/or the identification of the clients. For example, parts of the local network storage 108 can only be accessed by clients coupled to the same local network as the server 104. In other cases, the local network storage 108 can use a predetermined encryption scheme for communication between the local network storage 108 and the clients. In other cases, the local network storage 108 can only be accessed by clients that have recently been authenticated.

FIG. 1 shows the local network storage 108 as separate from the communication network 102. However, the local network storage 108 can be part of communication network 102 or another communication network. FIG. 1 shows the remote network storage 110 as separate from the communication network 102. However, the remote network storage 110 can be part of the communication network 102 or another communication network. In some embodiments, the remote network storage 110 can be coupled to the Internet.

In some embodiments, the local network storage 108 or the remote network storage 110 can be configured as a distributed storage system having multiple storage devices coupled to the communication networks. The distributed storage system can include a Distributed Replicated Block Device (DRBD), a Distributed Network Block Device (DNBD), a Distributed File System (DFS), and a Hadoop Distributed File System (HDFS).

In some embodiments, a computer readable medium, such as the computer readable medium in the server 104, the client 106, and/or the network storages 108, 110 can be associated with a security level. In some cases, the entire computer readable medium or the entire network storage can be associated with a single security level. In other embodiments, a computer readable medium or a network storage can be divided into portions, and each portion can be associated with a particular security level. For example, a first portion of the computer readable medium can be associated with a first security level, and a second portion of the computer readable medium can be associated with a second security level that is different from the first security level. In some cases, the computer readable medium or the network storage can be divided into portions based on the underlying file directory structure. For example, a first folder of a computer readable medium can be associated with a first security level, and a second folder of a computer readable medium can be associated with a second security level. A portion of the storage medium or the network storage to which a particular security level can be assigned can be referred to as a security zone.

In some embodiments, a computer system can maintain an association between a security zone and its security level in a configuration file. The configuration file can maintain such associations using a data structure, such as an array, an object, a table, a hash table, a map, or any other data structures that can maintain security zone—security level pairs. The configuration file can include an encrypted text file containing JavaScript Object Notation (JSON) instructions to associate a security zone and a security level. The JSON instructions can include a list of structures where each structure includes a description of the security zone, an identifier, a security level of the security zone and any other relevant information, including an amount of time out to limit the maximum usage time of a security zone. In other embodiments, a computer system can maintain the association between a security zone and its security level in a database.

In some cases, the configuration file can be maintained on a central server and can be "pushed" to a computer system. In other cases, it may be desirable to store the configuration file in a storage medium that can be accessed rapidly. Rapid access to the configuration file may be desirable to maintain the file system performance.

In some embodiments, a computer system can also associate a security level to a data item. For example, the security level of a data item can be set as the security level of the security zone in which the data item is stored (e.g., the data item can automatically/manually inherit the security level of the security zone). For example, if a data item is stored in a security zone of security level 3, the data item can be associated with security level 3.

In some embodiments, a computer system can associate a running instance of an application with a restriction level. A computer system can determine a restriction level of an application instance based on security levels of security zones that have been accessed by the application instance. In particular, the computer system can set a restriction level of an application instance as the highest security level of all security zones from which the application instance has retrieved data items (e.g., the application instance can inherit a security level that corresponds to the most-restrictive security zone it has accessed). For example, if an application instance initially accesses a security zone having security level 3, the computer system associates the application instance with restriction level 3. If the same application instance, at a later time, accesses a security zone having security level 5, the computer system associates the application instance with restriction level 5. However, if the same application instance, at a later time, accesses a security zone with a security level 1, the computer system does not update the restriction level of the application instance, as the restriction level of the application instance is higher than the security level of the accessed security zone. This restriction level update procedure can be a one-way process: the restriction level of an application instance preferably cannot be lowered unless the application instance is terminated and restarted. In such embodiments, the only way to "lower" the restriction level is to restart the application instance.

In some embodiments, a computer system can associate a running instance of an application with an access level. An access level of an application instance can be defined as the highest security level of security zones currently accessed by an application instance. For example, if an application instance is accessing a first security zone with security level 1 and a second zone with security level 2, the computer system associates the application instance with access level 2. If the application instance releases the second security zone, the access level of the application would be downgraded to access level 1.

In some embodiments, a computer system can maintain an association between an application instance and its restriction level in memory (e.g., the restriction level of an application can be persistent). The computer system can also maintain an association between an application instance and its access level in memory. The computer system can maintain the associations using a data structure, such as an array, an object, a table, a hash table, a map, or any other data structures that can represent application instance—restriction level pairs and application instance—access level pairs. In other embodiments, the computer system can maintain an association in a database.

In some embodiment, a security level of a security zone, a restriction level of an application instance, and an access level of an application instance can be represented as one of a plurality of candidate levels. The candidate levels can be a numerical value, an alphabetical value, a string of characters, or any combinations thereof.

A computer system, such as a server 104 and a client 106, can include a module that can be configured to monitor application instances running on the computer system or another computer system in order to enforce a security policy. For example, the module can be configured to police how the application instances interact with security zones based on restriction levels associated with the application instances and security levels associated with the security zones.

At a high level, the module can be configured to receive a request from an application instance to authorize the application instance to write a data item to a security zone. Upon receiving the request, the module can authorize or prevent the application instance from writing the data item to the security zone based on the restriction level associated with the application instance and the security level associated with the security zone. For example, the module can authorize the application instance to write the data item to a security zone if the restriction level of the application instance is lower than the security level of the security zone. In contrast, the module can prevent the application instance from writing the data item to the security zone if the restriction level of the application instance is higher than or equal to the security level of the security zone. For instance, if an application instance is associated with restriction level 3, the module can prevent the application instance from writing a data item to a security zone of security level 1.

Figure 2:
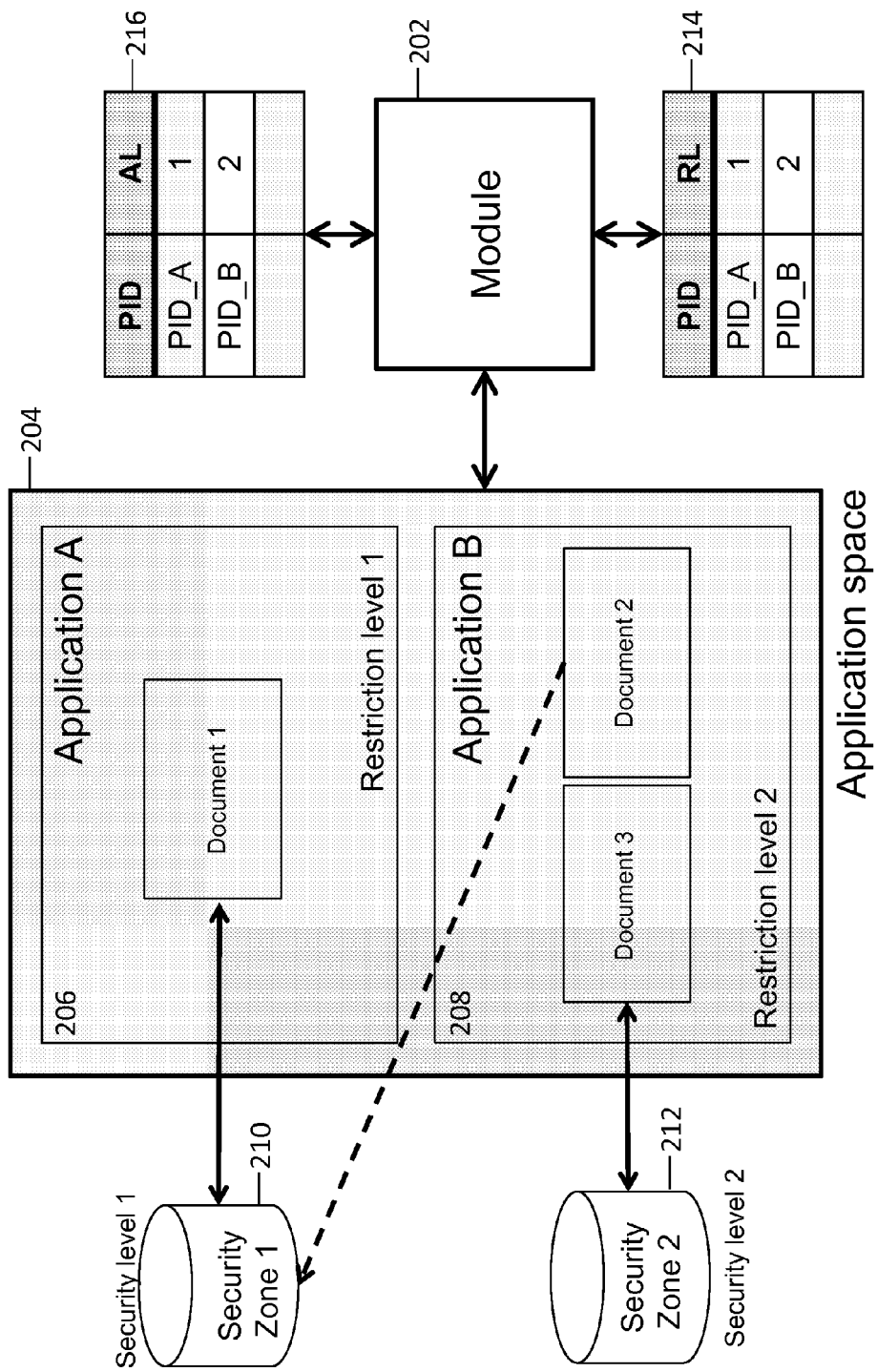
FIG. 2 is a diagram showing an exemplary process of how a module can police write privileges of an application instance.

FIG. 2 is a diagram showing an exemplary process of how a module can police write privileges of an application instance. FIG. 2 shows a computer system having a module 202, an application space 204 accommodating an application instance A 206 and an application instance B 208, a security zone 1 210 associated with security level 1, a security zone 2 212 associated with security level 2, a restriction level table (RLT) 214, and an access level table (ALT) 216. The application instances 206, 208 can write data items to, and read data items from the security zones 210, 212, subject to the write privilege control by the module 202.

The computer system can maintain a RLT 214, which can include a list of entries, each entry indicating an application instance and a restriction level associated with the application instance. In some cases, the RLT may only maintain entries associated with currently running application instances. The computer system can also maintain an ALT 216, which can includes a list of entries, each entry indicating an application instance and an access level associated with the application instance. In some aspects, the RLT 214 and the ALT 216 can refer to an application instance using a process identifier (PID), used by the operating system kernel to temporarily identify the application instance. For example, the RLT 214 and the ALT 216 use the PID associated with the application instance A, PID_A, to refer to the application instance A; the RLT 214 and the ALT 216 use the PID associated with the application instance B, PID_B, to refer to the application instance B.

In this illustration, the module 202 can authorize the application instance A 206 to write to the security zone 1 210. The security level of the security zone 1 210 is 1, and the restriction level of the application instance A 206 is also 1, as indicated by the restriction level of PID_A in the RLT 214. Because the restriction level of the application instance A 206 is the same as the security level of the security zone 1 210, the module 202 can authorize the application instance A 206 to write to the security zone 1 210.

In contrast, the module 202 can prevent the application instance B 208 from writing to the security zone 1 210. The security level of the security zone 1 210 is 1, but the restriction level of the application instance B 208 is 2, as indicated by the restriction level of PID_B in the RLT 214. Because the restriction level of the application instance B 208 is higher than the security level of the security zone 1 210, the module 202 can prevent the application instance B 208 from writing to the security zone 1 210. Note, however, that because the restriction level of the application instance B 208 is the same as the security level of the security zone 2 212, the module 202 can authorize the application instance B 208 to write to the security zone 2 212.

This module 202 can be useful in preventing a user from (1) retrieving a secure data item using an application instance, (2) copying information from the secure data item, and (3) saving the information as an insecure data item using the same application instance. For example, the application instance B 208 cannot copy information from document 3 and store the copied information in document 2 because the module 202 prevents the application instance B 208 from writing to the security zone 1 210. This feature can ensure that secure information is not leaked to an unsecure computer readable medium within the same application instance. Note also that the module 202 can control write privileges of applications without any prior knowledge of how the applications operate. This is beneficial because the module 202 can control write privileges of any type of applications running on any type of computer systems.

Figure 3:
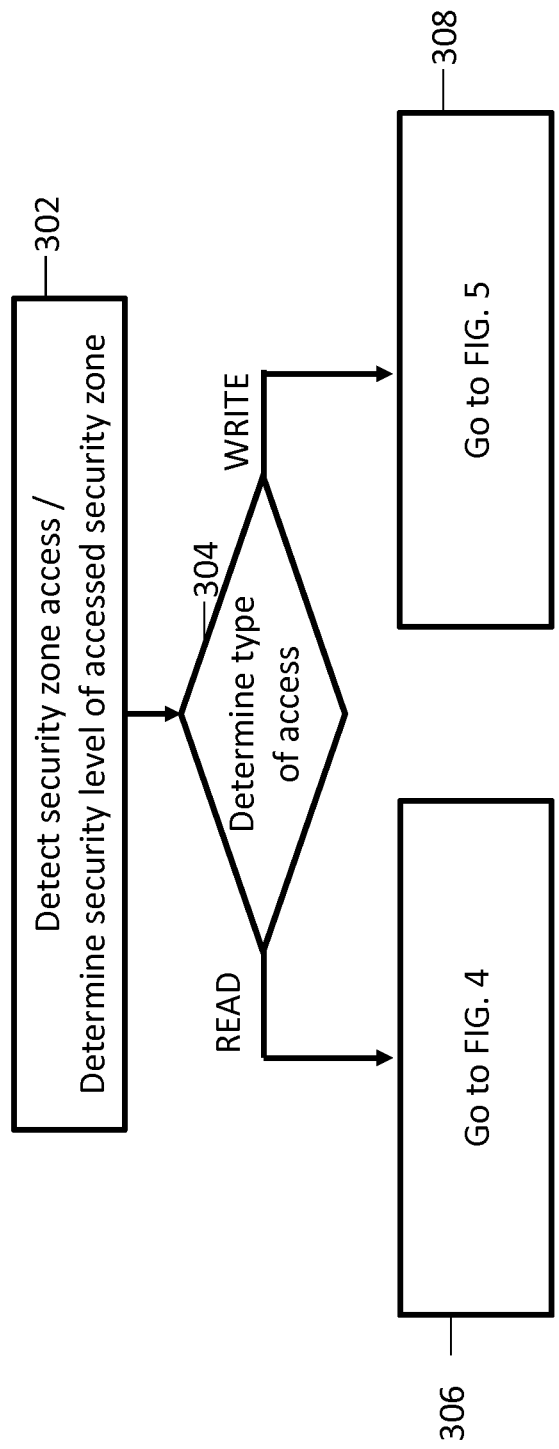
FIGS. 3-5 are diagrams of exemplary processes for controlling write privileges of an application instance.
Figure 4:
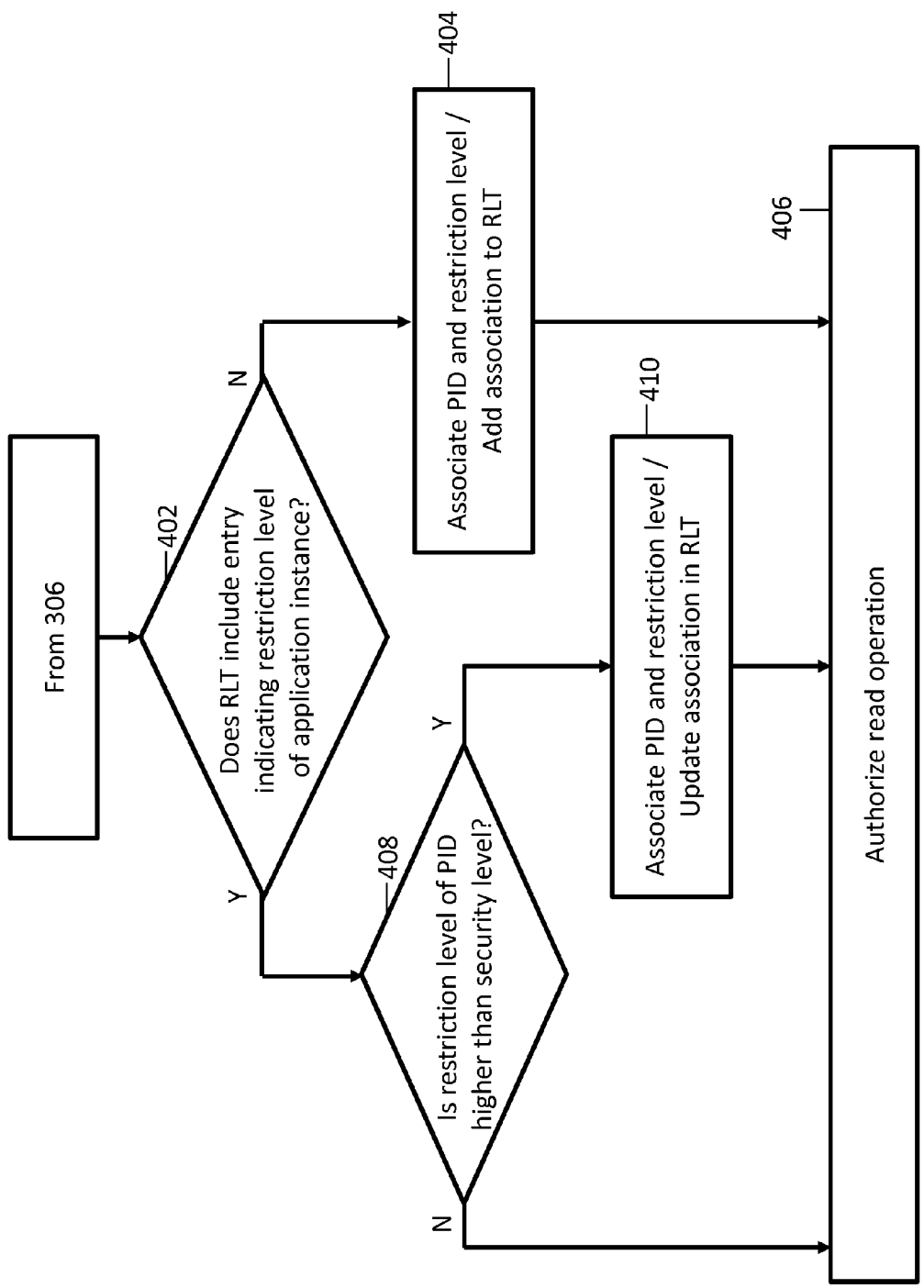
Figure 5:
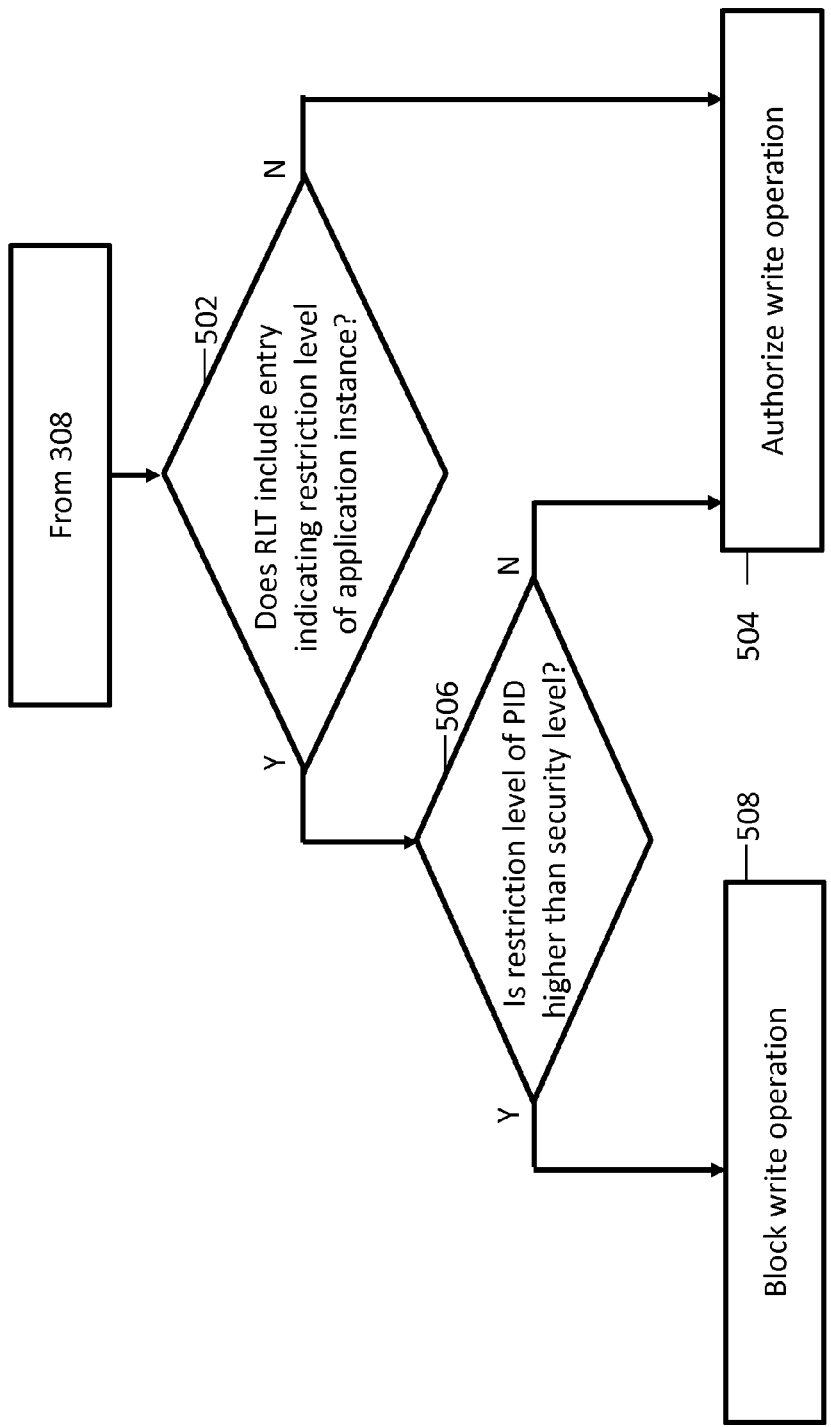

FIGS. 3-5 are diagrams of exemplary processes for controlling write privileges of an application instance. In step 302, the module 202 can detect that an application instance is attempting to access a security zone. For example, the module 202 can receive a request, from the application instance, to authorize access to a security zone. Once an attempted access is detected, the module 202 can determine the security level associated with the security zone. In step 304, the module 202 can determine whether the application instance is attempting to access the security zone to read a data item from the security zone or whether the application instance is attempting to access the security zone to write a data item to the security zone. Based on that determination, the module 202 can proceed with different procedures, as illustrated in FIGS. 4 and 5.

If the application instance is attempting to access the security zone to read a data item, then the module 202 can proceed to FIG. 4 to control the read operation of the application instance and, if necessary, to update the restriction level of the application instance. FIG. 4 illustrates a process for controlling a read operation of an application instance in accordance with some embodiments of the disclosed subject matter. In step 402, the module 202 can determine whether the restriction level table (RLT) 214 includes an entry indicating the restriction level of the application instance. In some cases, the module 202 can search the RLT 214 using the process identifier (PID) of the application instance.

If the RLT 214 does not include an entry indicating the restriction level of the application instance, in step 404, the module 202 can associate the application instance with the restriction level, and add the association to the RLT 214. In some embodiments, the module 202 can set the restriction level to be the same as the security level of the security zone to be accessed by the application instance. For example, if the application instance is attempting to access a security zone having security level 2, the restriction level of the application instance can be set to 2. Subsequent to adding the association of the application instance and the restriction level to the RLT 214, in step 406, the module 202 can authorize the application instance to proceed with the read operation. In some embodiments, the module 202 can authorize the application instance to proceed with the read operation by sending an authorization message to the application instance.

In step 402, if the RLT 214 does include an entry indicating the restriction level of the application instance, the module 202 can proceed to step 408. In step 408, the module 202 can determine whether the restriction level of the application instance is higher than the security level of the security zone to be accessed by the application instance. If the restriction level of the application instance is higher than the security level of the security zone, then in step 410, the module 202 can associate the application instance with a new restriction level and update the association in the RLT 214. In some cases, the new restriction level associated with the application instance can be set as the security level of the security zone. Subsequently, the module 202 can proceed to step 406 and authorize the application instance to proceed with the read operation.

In step 408, if the restriction level of the application instance is not higher than the security level of the security zone, then the module 202 can proceed to step 406 and authorize the application instance to proceed with the read operation.

Referring back to FIG. 3, in step 304, if the application instance is attempting to access the security zone to write a data item or to update a stored data item, then the module 202 can proceed to FIG. 5 to control the write operation of the application instance. FIG. 5 illustrates a process for controlling a write operation of an application instance in accordance with some embodiments of the disclosed subject matter.

In step 502, the module 202 can determine whether the restriction level table (RLT) 214 includes an entry indicating the restriction level of the application instance. In some cases, the module 202 can search the RLT 214 using the process identifier (PID) of the application instance.

If the RLT 214 does not include an entry indicating the restriction level of the application instance, in step 504, the module 202 can authorize the application instance to proceed with the write operation. In some embodiments, the module 202 can authorize the application instance to proceed with the write operation by sending an authorization message to the application instance.

If the RLT 214 does include an entry indicating the restriction level of the application instance, the module 202 can proceed to step 506. In step 506, the module 202 can determine whether the restriction level of the application instance is higher than the security level associated with the security zone to which the application instance attempts to write. If the restriction level of the application instance is not higher than the security level associated with the security zone, then the module can proceed to step 504 to authorize the application instance to write to the security zone; If the restriction level of the application instance is higher than the security level associated with the security zone, then the module can proceed to 508 to prevent the application instance from writing to the security zone.

While controlling write privileges of an application instance can be effective in limiting data leakage to insecure security zones within the application instance, it may not be effective for data leakage across application instances. For example, referring to FIG. 2, a user can (1) copy information from document 3 of the application instance B 208, which is associated with the security zone 2 212 of security level 2, (2) paste the copied information to document 1 of the application instance A 206, which is associated with the security zone 1 210 of security level 1, and (3) store the copied information as document 1 in the security zone 1 210. This way, the user could work around the write privilege control to store confidential information of document 3 in the security zone 1 210 with a lower security level.

In some embodiments, to limit data leakage across application instances, the module 202 can prohibit data communication between application instances based on the restriction level of application instances. In some embodiments, the module 202 can prevent a user from copying information from an application instance of a high restriction level to another application instance of a lower restriction level. To this end, the module 202 can detect a data transfer event, for example, an attempt, by a user, to copy information from a first data item of a first application instance and to paste the copied information to a second data item of a second application instance. In some aspects, the module 202 can snoop on application-level messages to detect such a data transfer event. Once the data transfer event is detected, the module 202 can determine a first restriction level associated with the first application instance and a second restriction level associated with the second application instance. If the first restriction level is higher than the second restriction level, then the module 202 can prevent the data transfer.

In some embodiments, to further limit data leakage across application instances, the module 202 can notify users of the restriction levels associated with application instances. This way, it would be less likely that a user inadvertently transfers data from a first application instance having a high restriction level to a second application instance having a lower restriction level. To this end, the module 202 can cooperate with a notification application. For example, when an application instance is associated with restriction level 3, the module 202 can cause the notification application to notify the user that the restriction level of the application instance is 3.

The disclosed notification application can notify restriction levels and/or access levels, which are indicative of a security of the accessed data. Notifying restriction levels and/or access levels is different from notifying that a communication channel is secure since a secure communication channel can be used to access data with a low security level. Also, the disclosed notification application can notify the restriction level and/or access level of any type of application, such as word processing applications, presentation applications, graphic design applications, and web browsers.

Figure 6:
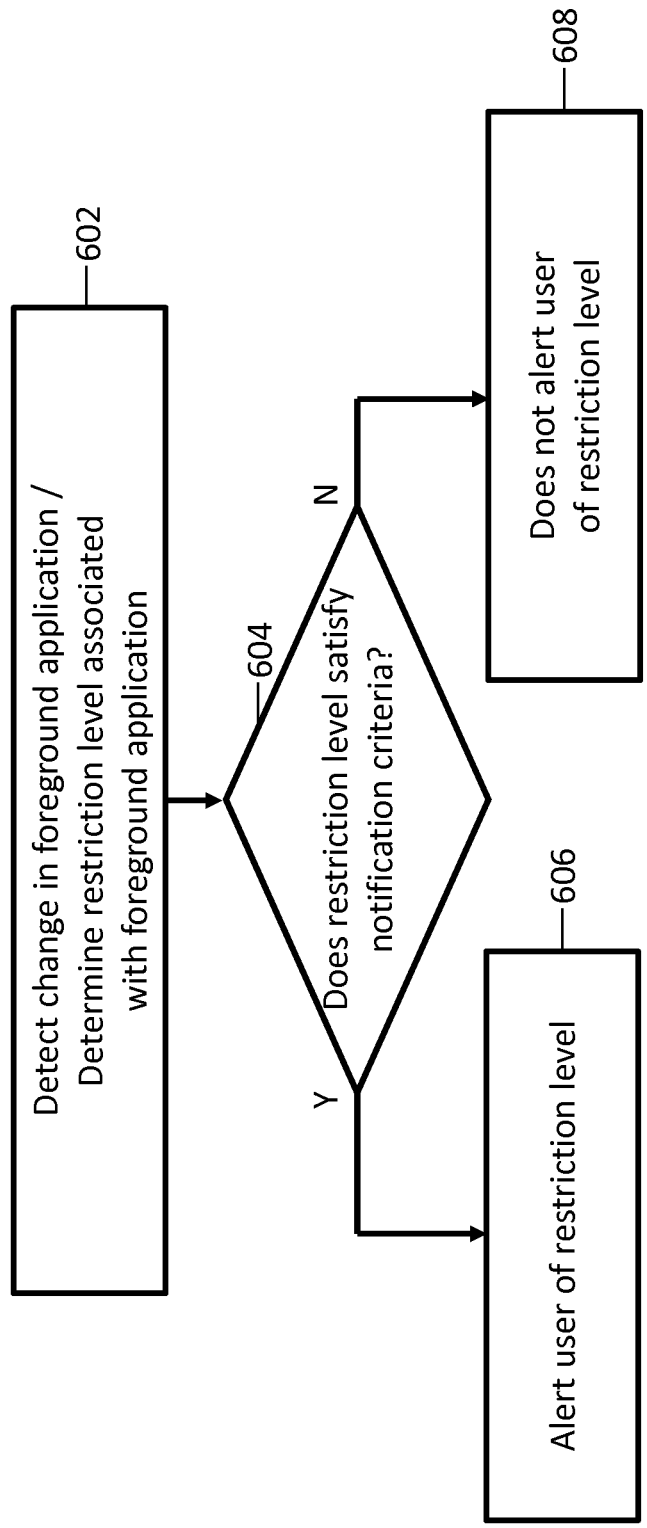
FIG. 6 is a diagram of an exemplary process for notifying a restriction level of an application instance.

FIG. 6 is a diagram of an exemplary process for notifying a restriction level of an application instance. In step 602, the notification application determines which one of the application instances is a foreground application. The foreground application is an active application that is displayed in the foreground of the user interface. In some instances, the notification application is configured to detect changes in the foreground application. In particular, the notification application can detect certain events that may change the foreground application, and use those events as a triggering event for determining the foreground application. For example, a user interface can change the foreground application when a user selects one of the applications to bring it forward. Therefore, the notification application can detect a selection event initiated by the user, and, in response to the selection event, determine the foreground application.

If the foreground application has changed, the notification application can determine the restriction level associated with the foreground application. In some embodiments, the notification application can determine the restriction level of the foreground application by communicating with a user interface control (UIC) module of the module 202. For instance, the notification application can send a request to the UIC module for the restriction level associated with the foreground application. In response, the UIC module can send the restriction level of the foreground application to the notification application. In other embodiments, the notification application can maintain a copy of the restriction level table (RLT) 214 and use that copy of the RLT 214 to determine the restriction level of the foreground application.

In step 604, the notification application can determine if the restriction level associated with the foreground application satisfies notification criteria. If the restriction level associated with the foreground application satisfies notification criteria, then in step 606, the notification application can alert the user of the application's restriction level. If the restriction level associated with the foreground application does not satisfy the notification criteria, then in step 608, the notification application can remove any existing alerts.

In some embodiments, a restriction level associated with a foreground application satisfies the notification criteria if the restriction level is higher than a predetermined restriction level threshold. For example, the notification application can be configured to notify a user if the restriction level of the foreground application is greater than 3.

In other embodiments, a restriction level associated with a foreground application satisfies the notification criteria if the restriction level is an element in a notification group. A computer system can define a notification group at which the user should be notified. For example, a notification group can include restriction levels of "normal", "relatively high", and "high". If the restriction level associated with the foreground application is one of the elements in that notification group, then the restriction level associated with the foreground application would satisfy the notification criteria, and therefore the notification application would notify the user.

In some embodiments, the notification application can notify the user using a restriction level alert (RLA) icon. For example, a user interface of an operating system, such as Windows or OS X, can include a status bar. This status bar can be configured to maintain a RLA icon so that whenever the restriction level of the foreground application satisfies the notification criteria, the notification application can change the appearance of the RLA icon. In some cases, the notification application can change the color of the RLA icon; in other cases, the notification application can periodically blink the RLA icon; in other cases, the notification application can change the shape of the RLA icon.

In some embodiments, the notification application can notify the user using a sound cue. The sound cue can be different for different restriction level of the application instance. In some cases, the notification application can provide the sound cue in conjunction with the RLA icon.

Figure 7A:
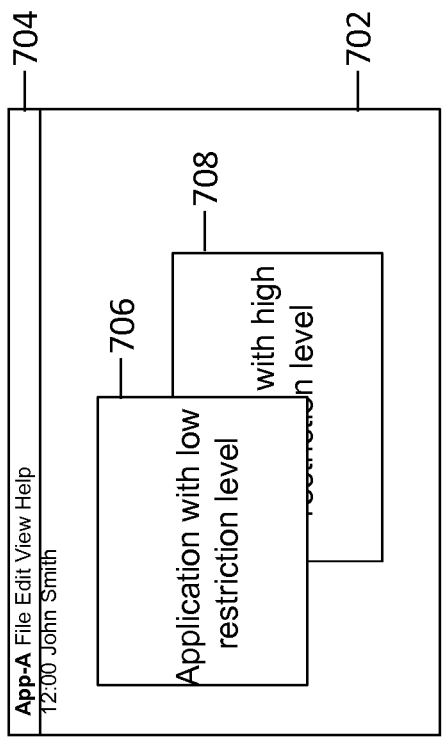
FIGS. 7A-7B are exemplary diagrams showing how a notification application can modify an appearance of a status bar.
Figure 7B:
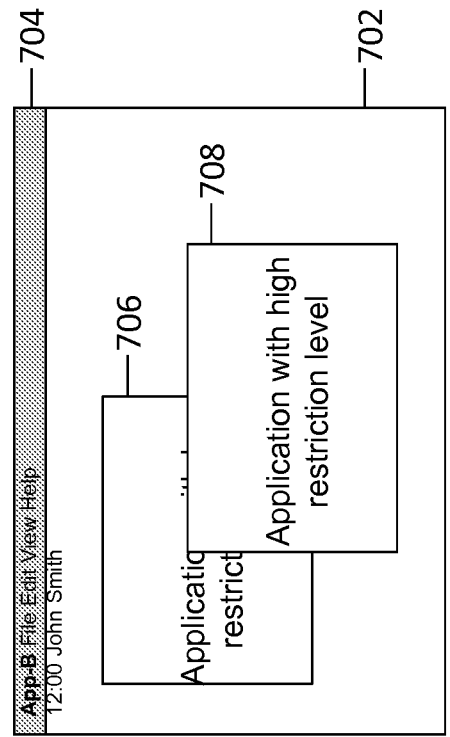

In some embodiments, the notification application can alert the user by modifying the appearance of a status bar in a user interface. FIGS. 7A-7B are exemplary diagrams showing how a notification application can modify an appearance of a status bar. FIG. 7A includes a user interface 702, a status bar 704, an application instance 706 with a low restriction level, and an application instance 708 with a high restriction level. In this illustration, a foreground application satisfies the notification criteria if the restriction level of the foreground application is higher than a predetermined restriction level threshold. FIG. 7A illustrates a scenario in which the foreground application is the application instance 706. Because the restriction level of the application instance 706 is low and below the predetermined restriction level threshold, the application instance 706 does not satisfy the notification criteria. Therefore, the notification application leaves the status bar 704 in its default appearance.

FIG. 7B illustrates a scenario in which the application instance 708 is brought to the foreground. When the application instance 708 is brought to the foreground, the notification application can use the process illustrated in FIG. 6 to determine whether or not the notification application should notify the user of the restriction level. In this case, because the restriction level of the application instance 706 is high and above the predetermined restriction level threshold, the application instance 706 does satisfy the notification criteria. Therefore, the notification application modifies the appearance of the status bar 704 to alert the user.

In some embodiments, the notification application modifies the appearance of status bar 704 by causing the user interface 702 to change the color of the status bar 704, as illustrated in FIG. 7B. In other embodiments, the notification application modifies the appearance of status bar 704 by providing a colored, transparent box over the status bar 704, thereby achieving a similar effect as causing the user interface 702 to change the color of the status bar 704. In other embodiments, the notification application modifies the appearance of status bar 704 by providing a transparent, checkbox, hatched box, or a shaded box over the status bar 704.

In some embodiments, the module 202 can notify, to a user, an access level associated with an application instance, instead of a restriction level associated with an application instance. To this end, the module 202 can compute an access level of an application using an access level determination (ALT) module and cause the notification application to notify a user of the access level associated with an application instance using the user interface control (UIC) module.

To determine an access level of an application, the ALT module can maintain or communicate with a security level table. The security level table can indicate, for each application instance, the number of currently-accessed data items associated with each security level. FIG. 8 is an illustration of an exemplary security level table. The security level table (SLT) 802 includes two sub-tables 804A, 804B, one for each application instance. Each sub-table includes a list of security levels 806A, 806B supported by the computer system and, for each security level, the number of currently-accessed data items 808A, 808B, retrieved from a security zone associated with the security level. For example, according to the sub-table 804A, the application instance A has four data items open, two data items retrieved from one or more security zones having security level 2, one data item retrieved from a security zone having security level 3, two data items retrieved from one or more security zones having security level 5, and one data item retrieved from a security zone having security level 9.

The ALT module can generate or remove a sub-table 804 when an application instance is newly opened or closed, respectively. The module 202 can update the sub-table 804 for an application instance when the application instance newly accesses a data item or when the application instance releases an access to a currently-accessed data item.

The ALT module can determine the access level of an application instance using the security level table 802. In particular, the module 202 can determine, from the sub-table of the application instance, the highest security level for which the count 808 is non-zero. For the application instance A (PID_A), the access level is 9; for the application instance B (PID_B), the access level is 6.

In some embodiments, the module 202 can use a user interface control (UIC) module to cause the notification application to notify users of access levels. For example, when an application instance is associated with access level 3, the UIC module can cause the notification application to notify the user that the access level associated with the application is 3. The process for notifying the restriction level, as illustrated in FIGS. 6 and 7, can be easily adopted to notify the access level.

Figure 9:
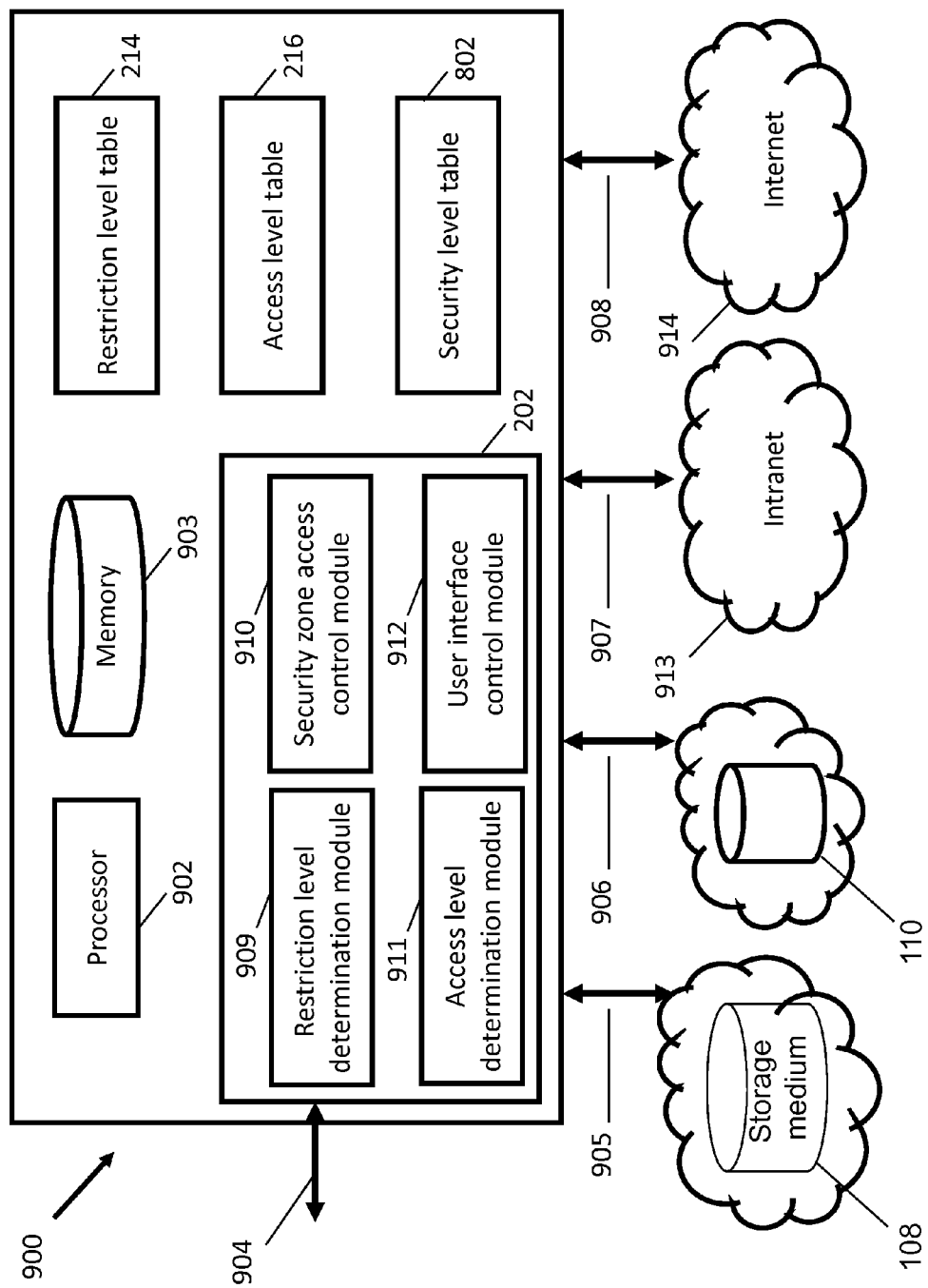
FIG. 9 is a block diagram of an exemplary computing system.

FIG. 9 is a block diagram of an exemplary computing system. The computing system 900 includes a processor 902, a memory 903, interfaces 904-908, a module 202 including a restriction level determination module 909, a security zone access control module 910, an access level determination module 911, and a user interface control module 912, a restriction level table 214, an access level table 216, and a security level table 802. The computing device 900 can communicate with other computing devices (not shown) via the interface 904; the computing device 900 can communicate with the local network storage 108 via the interface 905; the computing device 900 can communicate with the remote network storage 110 via the interface 906; the computing device 900 can communicate with the Intranet 913 via the interface 907; and the computing device 900 can communicate with the Internet 914 via the interface 908. The interfaces 904-908 are shown as separate interfaces but may be the same physical interface.

In some embodiments, the processor 902 is configured to run an application instance in a user space of an operating system. The processor 902 is also configured to run a notification application in the user space of the operating system. The processor 902 can include one or more cores and can accommodate one or more threads to run the application instance and the notification application.

The restriction level determination (RLD) module 909 can be configured to determine a restriction level associated with an application instance. For example, when an application instance requests a read access to a security zone, the RLD module 909 can determine whether the application instance is associated with a restriction level. If the application instance is not associated with a restriction level, then the RLD module 909 can set the restriction level of the application instance as the security level of the security zone. If the application instance is associated with a restriction level, then the RLD module 909 can determine if the security level of the security zone is higher than the restriction level of the application instance. If so, then the RLD module 909 can update the restriction level of the application instance as the security level of the security zone. If not, then the RLD module 909 does not update the restriction level of the application instance.

The security zone access control (SAC) module 910 can be configured to control write privileges of an application instance. For example, when an application instance can request a write access to a security zone, the SAC module 910 can determine whether the application instance is associated with a restriction level. If the application instance is not associated with a restriction level, then the SAC module 910 can authorize the application instance to write to the security zone. If the application instance is associated with a restriction level, then the SAC module 910 can determine if the restriction level of the application instance is higher than the security level of the security zone. If so, then the SAC module 910 can prevent the application instance from writing to the security zone; if not, then the SAC module 910 can allow the application instance to write to the security zone.

The access level determination (ALD) module 911 can be configured to determine the access level of application instances. In some cases, the ALD module 911 can use a security level table 802 to determine the access level, and maintain the access level of application instances in an access level table 216.

The user interface control (UIC) module 912 can be configured to cooperate with a notification application to notify users of an alert level associated with an application instance. In particular, the UIC module 912 can provide the alert level associated with active application instances to the notification application. The alert level can include at least one of a restriction level or an access level.

In some embodiments, the module 202 can be implemented in a kernel space of an operating system. In particular, the module 202 can be implemented as a kernel based restriction implemented in the kernel space of an operating system. The kernel based restriction can operate as an intermediary between a user space (in which an application instance operates) and hardware components of a computing system. The kernel based restriction and the user space can use a kernel interface for communication. The kernel interface can include Portable Operating System Interface (POSIX).

The kernel based restriction can authorize an application instance to access a hardware component, such as a storage medium. For example, when an application instance, running in a user space of the operating system, attempts to write a data item in a storage medium, the application instance can send an authorization request to the kernel based restriction, requesting a write access to a storage medium. The authorization request can be a system call defined in an operating system-specific header file. In response, the kernel based restriction can determine whether or not the application instance is authorized to write the data item in the storage medium. If the application instance is authorized to write the data item, then the kernel based restriction can send an acknowledgment message to the application instance, authorizing the application instance; if the application instance is not authorized to write the data item, then the kernel based restriction can send a rejection message to the application instance, indicating that the application instance cannot access the storage medium.

In some embodiments, the kernel based restriction can be implemented using a kernel, or a loadable kernel module for a kernel. The loadable kernel module is an object file that extends capabilities of the kernel of an operating system. The loadable kernel module is often used to support additional system calls, new hardware, and/or new file systems. For example, the kernel based restriction can be implemented as a loadable kernel module that is registered as a callback, also known as a listener, that makes an authorization decision for accessing storage media.

In other embodiments, the kernel based restriction can be implemented as a microkernel, a loadable kernel module for a microkernel, a Kernel Authorization (Kauth) system, or a loadable kernel module for a Kauth system. In some operating systems, the loadable kernel module is also referred to as a kernel extension (Kext).

In other embodiments, the module 202 can include an access control list (ACL.) The ACL can maintain which application instance can access certain security zones. In some embodiments, the module 202 can be implemented as an application running in an application space of a computer system.

In some embodiments, the module 202 can be implemented on a stand-alone computing system, such as a client 106, to provide access control to the computing system's local storage medium. In other embodiments, the module 202 can be implemented on a server 104 for providing an access control service to clients 106. For example, the module 202 can control access of server's local storage or the network storages 108, 110 by clients 106. In another example, the module 202, implemented on a server 104, can control client's access of its own local storage medium.

The notification application (NA) module 913 can be configured to notify an alert level associated with a foreground application instance to users. The NA module 913 can determine when a user interface, such as a desktop screen, brings an application instance to a foreground. The user interface can bring an application instance to the foreground in response to a predetermined event. For instance, the user interface can change the foreground application when a user selects an application instance from a background.

Once the NA module 913 determines that an application instance is in a foreground, the NA module 913 can determine an alert level associated with the foreground application instance. To this end, the NA module 913 can communicate with the UIC module 912. For example, the NA module 913 can request the UIC module 912 to provide an alert level associated with the foreground application instance. In response to the request, the UIC module 912 can provide the requested alert level to the NA module 913. The alert level can include a restriction level and/or an access level.

Upon determining the alert level associated with the foreground application instance, the NA module 913 can notify the alert level to the user using visual cues. In some cases, the NA module 913 can notify the alert level using an alert level notification icon. The alert level notification icon can be located in a status bar of the user interface. In other cases, the NA module 913 can notify the alert level by changing an appearance of a status bar in the user interface. For example, the NA module 913 can cause a perceived change of color in the status bar.

In some embodiments, the module 202 and the NA module 913 can be implemented in software stored in the memory 903. The memory 903 can be a non-transitory computer readable medium, flash memory, a magnetic disk drive, an optical drive, a programmable read-only memory (PROM), a read-only memory (ROM), or any other memory or combination of memories. The software can run on a processor 902 capable of executing computer instructions or computer code. The processor 902 might also be implemented in hardware using an application specific integrated circuit (ASIC), programmable logic array (PLA), field programmable gate array (FPGA), or any other integrated circuit.

FIG. 9 shows a computing system 900 having a module 202 that perform the above-described operations in accordance with some embodiments of the disclosed subject matter. The computing system 900 may include additional modules, less modules, or any other suitable combination of modules that perform any suitable operation or combination of operations.

The interfaces 904-908 provide an input and/or output mechanism for communication. In some cases, the interfaces 904-908 can be used to communicate within the computing system. For example, the processor 902 can use one of the interfaces 904-908 to communicate with memory 903. In other cases, the interface 904-908 can be used to communicate over a network. The interfaces 904-908 enable communication with other computing systems, such as clients 106 and servers 104, as well as other network nodes in the communication network 102. The interfaces 904-908 can be implemented in hardware to send and receive signals in a variety of mediums, such as optical, copper, and wireless, and in a number of different protocols some of which may be non-transient.

The computing system 900 can operate using an operating system (OS) software. In some embodiments, the OS software is based on a Linux software kernel and runs specific applications in the computing system 900 such as monitoring tasks and providing protocol stacks. The OS software allows resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

The system's software can be divided into a series of tasks that perform specific functions. These tasks communicate with each other as needed to share control and data information throughout the computing system 900. A task can be a software process that performs a specific function related to system control or session processing. Three types of tasks operate within the computing system 900 in some embodiments: critical tasks, controller tasks, and manager tasks. The critical tasks control functions that relate to the computing system's ability to process calls such as initialization, error detection, and recovery tasks. The controller tasks can mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem includes critical tasks, controller tasks, and manager tasks. Some of the subsystems that run on the computing system 900 include a system initiation task subsystem, a high availability task subsystem, a shared configuration task subsystem, and a resource management subsystem.

The system initiation task subsystem can be responsible for starting a set of initial tasks at system startup and providing individual tasks as needed. The high availability task subsystem can work in conjunction with the recovery control task subsystem to maintain the operational state of the computing system 900 by monitoring the various software and hardware components of the computing system 900. Recovery control task subsystem can be responsible for executing a recovery action for failures that occur in the computing system 900 and receives recovery actions from the high availability task subsystem. Processing tasks can be distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

Shared configuration task subsystem can provide the computing system 900 with an ability to set, retrieve, and receive notification of configuration parameter changes and is responsible for storing configuration data for the applications running within the computing system 900. A resource management subsystem can be responsible for assigning resources (e.g., processor and memory capabilities) to tasks and for monitoring the task's use of the resources.

In some embodiments, the computing system 900 can reside in a data center and form a node in a cloud computing infrastructure. The computing system 900 can also provide services on demand. A module hosting a client is capable of migrating from one computing system to another system seamlessly, without causing program faults or system breakdown. The computing system 900 on the cloud can be managed using a management system.

The client 106 can include user equipment. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The computing system 900 can be a client 106. The client 106 also includes any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. The client 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The client 106 can also provide a variety of user interfaces such as a keyboard, a touch screen, a trackball, a touch pad, and/or a mouse. The client 106 may also include speakers and a display device in some embodiments.

Throughout the disclosure, the term "application instance" is generally used to refer to an instance of an application or software to which a process identifier is assigned by an operating system. In some cases, a computer system can have multiple instances of the same application. For example, OS X can run multiple instances of Safari web browsers. In some embodiments, the application instance can include one or more processes that collaborate to run an application instance. Other embodiments of an "application instance" are within the scope of the disclosed subject matter.

Throughout the disclosure, the term "data item" is generally used to refer to a sequence of bits carrying information. The data item can include a file, a document, a record, contents of a file, a page in memory, a digital message, or any other entity that can be represented by a sequence of bits. Other embodiments of an "data item" are within the scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. An apparatus comprising:
   a non-transitory memory storing computer readable instructions;
   a processor in communication with the memory and with a non-transitory computer readable medium having a first security zone, wherein the computer readable instructions are configured to cause the processor to:
   receive a request, from an application instance running in a user space of an operating system, to access the first security zone, wherein the first security zone is associated with a first security level;
   determine whether a restriction level associated with the application instance is higher than the first security level, wherein the restriction level associated with the application instance is a function of previous security zones that have been accessed by the application instance;
   when the restriction level associated with the application instance is higher than the first security level, prevent the application instance from accessing the first security zone; and
   when the restriction level associated with the application instance is not higher than the first security level, authorize the application instance to access the first security zone.

2. The apparatus of claim 1, wherein the non-transitory memory further comprises instructions that cause the processor to:
   determine whether the application instance is associated with any restriction level; and when the application instance is not associated with any restriction level, authorize the application instance to access the first security zone.

3. The apparatus of claim 1, wherein the restriction level associated with the application instance is a highest security level of all previous security zones that have been accessed by the application instance.

4. The apparatus of claim 1, wherein the association between the first security zone and the first security level is maintained in a configuration file stored in the non-transitory memory.

5. The apparatus of claim 1, wherein the request to access the first security zone includes a request to authorize a write operation to the first security zone.

6. The apparatus of claim 1, wherein the non-transitory memory further comprises instructions that cause the processor to:
receive a request, from the application instance, to authorize a read operation to a second security zone of the computer readable medium, wherein the second security zone is associated with a second security level;
determine whether the restriction level associated with the application instance is higher than the second security level; and
when the restriction level associated with the application instance is higher than the second security level, modify the restriction level of the application instance as the second security level.

7. The apparatus of claim 6, wherein the non-transitory memory further comprises instructions that cause the processor to:
determine whether the application instance is associated with any restriction level; and
when the application instance is not associated with any restriction level, associate the application instance with a restriction level, wherein the restriction level is set as the second security level.

8. The apparatus of claim 1, wherein the instructions are configured to be executed in a kernel space of the operating system.

9. The apparatus of claim 8, wherein the instructions comprise a loadable kernel module configured to be executed in the kernel space of the operating system.

10. A non-transitory computer readable medium having executable instructions operable to cause an apparatus to:
identify an attempt, by an application instance running in a user space of an operating system, to access a first security zone of non-transitory memory, wherein the first security zone is associated with a first security level;
determine whether a restriction level associated with the application instance is higher than the first security level, wherein the restriction level associated with the application instance is a function of previous security zones that have been accessed by the application instance;
when the restriction level associated with the application instance is higher than the first security level, prevent the application instance from writing to the first security zone; and
when the restriction level associated with the application instance is not higher than the first security level, authorize the application instance to access the first security zone.

11. The computer readable medium of claim 10, further comprising executable instructions operable to cause the apparatus to:
determine whether the application instance is associated with any restriction level; and
when the application instance is not associated with any restriction level, authorize the application instance to access the first security zone.

12. The computer readable medium of claim 10, further comprising executable instructions operable to cause the apparatus to:
identify an attempt by the application instance to perform a read operation to a second security zone of the computer readable medium, wherein the second security zone is associated with a second security level;
determine whether the restriction level associated with the application instance is higher than the second security level; and
when the restriction level associated with the application instance is higher than the second security level, modify the restriction level of the application instance as the second security level.

13. The computer readable medium of claim 12, further comprising executable instructions operable to cause the apparatus to:
determine whether the application instance is associated with any restriction level; and
when the application instance is not associated with any restriction level, associate the application instance with a restriction level, wherein the restriction level is set as the second security level.

14. A method comprising:
identifying, by a module in a computer system, an attempt to access, by an application instance running in a user space of an operating system, a first security zone of a computer readable medium, wherein the first security zone is associated with a first security level;
determining, by the module, whether a restriction level associated with the application instance is higher than the first security level, wherein the restriction level is a function of previous security zones that have been accessed by the application instance;
when the restriction level associated with the application instance is higher than the first security level, preventing the application instance from writing to the first security zone; and
when the restriction level associated with the application instance is not higher than the first security level, authorizing the application instance to access the first security zone.

15. The method of claim 14, further comprising:
receiving a request, from the application instance, to authorize a read operation to a second security zone of the computer readable medium, wherein the second security zone is associated with a second security level;
determining whether the restriction level associated with the application instance is higher than the second security level; and
when the restriction level associated with the application instance is higher than the second security level, modifying the restriction level of the application instance as the second security level.

16. The method of claim 14, wherein the association between the first security zone and the first security level is maintained in a configuration file stored in memory.

17. The method of claim 14, wherein the module in the computer system is running in a kernel space of the operating system.

18. The method of claim 17, wherein the module comprises a loadable kernel module running in the kernel space of the operating system.

19. The method of claim 17, wherein identifying the attempt to access the first security zone comprises receiving, from the application instance, a system call to authorize a write operation to the first security zone.

20. The method of claim 17, wherein authorizing the application instance to access the first security zone comprises sending, via an interface between the kernel space and the user space, an acknowledgment message to the application instance, indicating that the application instance is authorized to perform a write operation to the first security zone.

* * * * *